United States Patent [19]

Vermeulen

[11] 3,757,128
[45] Sept. 4, 1973

[54] MULTIPHASE TACHOMETER

[75] Inventor: Johannes C. Vermeulen, Longmont, Colo.

[73] Assignee: International Business Machines Corporation, Armonk, N.Y.

[22] Filed: Mar. 20, 1972

[21] Appl. No.: 235,956

[52] U.S. Cl. .... 250/231 SE, 250/211 J, 250/237 G, 356/169

[51] Int. Cl. ............................................ G01d 5/34

[58] Field of Search ................ 250/231 SE, 237 R, 250/237 G, 211 R, 211 J, 220 M; 356/169, 170; 317/235 N

[56] References Cited
UNITED STATES PATENTS

| | | | |
|---|---|---|---|
| 3,487,399 | 12/1969 | Wogatzke | 250/237 |
| 3,600,588 | 8/1971 | Sayce | 250/237 |
| 3,691,389 | 9/1972 | Ellis | 250/220 M |
| 3,522,435 | 8/1970 | Brean | 250/231 |
| 3,614,775 | 10/1971 | Brean | 250/231 SE |
| 3,693,023 | 9/1972 | Wasserman | 250/231 SE |
| 3,400,275 | 9/1968 | Trump | 250/231 SE |
| 3,310,798 | 3/1967 | Wingate | 250/231 SE |
| 3,486,032 | 12/1969 | Cufflin | 250/211 |

*Primary Examiner*—James W. Lawrence
*Assistant Examiner*—D. C. Nelms
*Attorney*—Herbert F. Somermeyer et al.

[57] ABSTRACT

A multiphase tachometer is substantially insensitive to minute relative position changes between a sensing element and the moving tachometer member.

Interdigited techniques, including integrated circuit sensing elements, minimize the distance between sensing elements.

11 Claims, 7 Drawing Figures

MULTIPHASE TACHOMETER

BACKGROUND OF THE INVENTION

The present invention relates to tachometer arrangements, particularly those generating two phase signals.

Multiphase tachometers have been sensitive to the relative position of a sensing element, the tachometer mask, and the moving tachometer element; that is, depending upon the relative position of these elements, the phase between the output signals may vary. In two-phase tachometers, the desired phase relationship is 90°; in a three-phase tachometer, the phases are equally spaced. Relative positional changes alter the phase relationship between the output signals, thereby creating error conditions. Also, as tachometer elements age, the light-to-dark ratio, as well as signal output, may vary as the elements degrade at different rates. Also, debris or other contaminations can cause different light intensities on the two sensing elements, particularly if they are spaced apart as has been the common practice.

The photosensing elements of the multiphase tachometers provide a relatively low amplitude output signal. Such signals are amplified and squared. Because of the interconnections between the sensing element and the amplifiers, noise may be introduced into the signals.

Plural phase tachometers, such as two, three, four, five, or six phases, can be constructed with the prior art methods. The spacing between the phase sensing elements becomes unduly large and, hence, more sensitive to more relative position, i.e., a phase-shift difference is introduced between the various phases in accordance with maladjustments between the sensing elements.

Since the phase relationship between the output signals in many precision tachometer systems is critical, installation of the sensing element in a given tachometer system can be time consuming and require relatively expensive adjustable supports. Even with these arrangements, phase differences can be encountered caused by vibration of the machines in which the tachometers are installed. What is needed is a simple tachometer system which is relatively insensitive to fine adjustments which provide plural output signals not subject to such undesired phase perturbations.

SUMMARY OF THE INVENTION

It is an object of the invention to provide a tachometer system and sensing elements providing substantially constant phase differential outputs irrespective of minor adjustment variations.

A tachometer system constructed in accordance with the present invention uses a plural phase sensing element array wherein the various elements effectively subtend the same arc or displacement area of a mask associated with a tachometer system.

A preferred form of the invention uses a sensing element of the integrated circuit type. The sensing elements extend radially in an interdigitated manner, the physical spacing between adjacent elements of the same phase being equal to the pitch of the light-dark areas of a tachometer disk or other element.

The foregoing and other objects, features, and advantages of the invention will become apparent from the following more particular description of preferred embodiments of the invention, as illustrated in the accompanying drawings.

THE DRAWINGS

DETAILED DESCRIPTION

Figure 1:
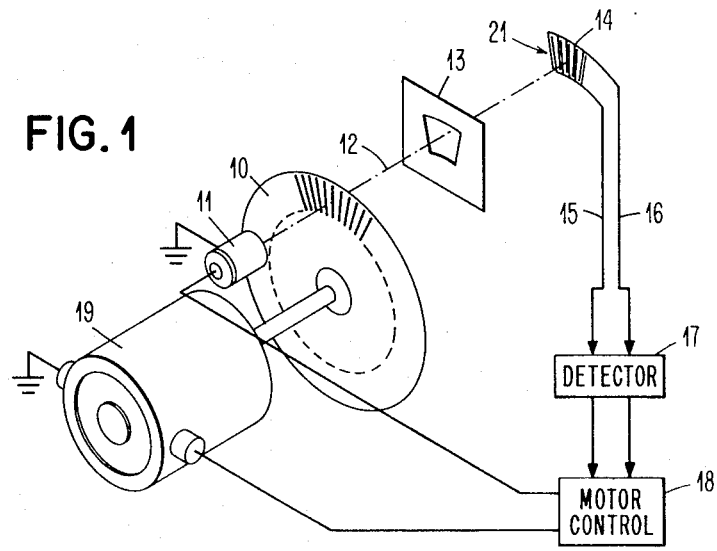
FIG. 1 is a simplified diagrammatic showing of the invention as applied to a rotary tachometer system.

FIG. 1 illustrates a system using the present invention with see-through tachometer disk 10. Reflective disk, or other forms of tachometer systems, may be used with equal advantage. Light source 11 supplies light along beam 12 through disk 10. Mask or aperture 13, preferably mounted directly on sensing element 14, limits the impinging light to a small area on two-phase sensing element 14. Element 14 supplies two 90° phase-displaced signals respectively over lines 15 and 16 to tachometer detector circuit 17. Detector 17 supplies direction and velocity information to motor control 18. Control 18 responds to the detector 17 signals plus set-point signals for controlling the velocity and displacement of tachometer disk 10 by motor 19. An exemplary application of the present invention is for driving a tape capstan in a tape transport mechanism.

All of the sensing elements 21 for both phases of the tachometer signals, as will be later fully described, subtend the same arc of tachometer disk 10 as limited by mask 13. Because of this arrangement, irrespective of minute adjustments of sensing element 14 with respect to mask 13 and tachometer disk 10, there will be undetectable phase-shift differences between the signals on lines 15 and 16; that is, in a 90° phase-shift tachometer system, the signals on lines 15 and 16 will be 90° phase displaced irrespective of minor positional variations of sensing element 14 with respect to tachometer disk 10 or mask 13.

Figure 2:
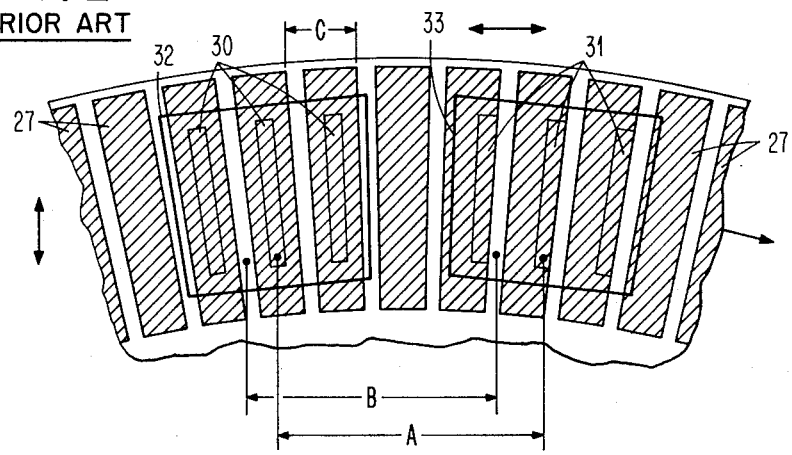
FIG. 2 is a diagrammatic showing of a prior art arrangement useful for illustrating the advantages of practicing the present invention.
Figure 3:
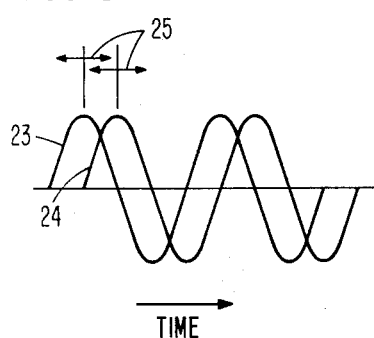
FIG. 3 is an idealized set of sine wave output signals from a two-phase tachometer facilitating an understanding of the phase-shift problem.

The invention is better understood by next referring to prior-art techniques of generating two-phase tachometer signals, as well as to FIG. 3, which shows idealized 90° displaced tachometer signals 23 and 24. When such signals are generated using the FIG. 2 illustrated prior-art system, minor adjustments in the location of the sensing elements cause substantial phase shift as between signals 23 and 24 as indicated by arrows 25 just above the peaks of those signals.

In FIG. 2, hatched rectangular boxes 27 represent shaded areas of a tachometer disk, with the spaces between such boxes representing "see-through" or light areas. Signals 23 and 24 are respectively generated by sensing elements 30 and 31, rspectively disposed adjacent mask apertures 32 and 33. The sensing elements are located ideally with respect to apertures 32 and 33 and tachometer disk 27. In the FIG. 2 illustration, as sensing elements 30 and 31 are moved radially outward along a common radius, axially of the rotation axis, or tangentially with respect to the tachometer disk and the mask apertures, phase shift is introduced between signals 23 and 24 in accordance with the geometry of the sensing system. The phase shift in degrees is set forth by the equation:

$$(A-B)/C \times 360° \qquad (1)$$

In the above equation, the numerals A, B, and C correspond respectively to the geometric dimensions shown in FIG. 2. C is the pitch of the tachometer disk, B is the center distance between adjacent lines of light when measured in the same spot as A, and A is the distance between the centers of the spaced-apart sensing elements. As the sensors or the mask move, B changes inducing a variable phase shift and amplitude in accordance with the adjustment of the sensing elements, the mask, and the tachometer disk. That is, the amount of light area and the relationships of light to the sensing elements is position sensitive.

In fine-resolution digital tachometers, distance C is quite small; hence, in order to reduce phase shift, A and B should be reduced to zero or some small number which makes the phase shift relatively constant. The present invention provides this result.

Figure 4:
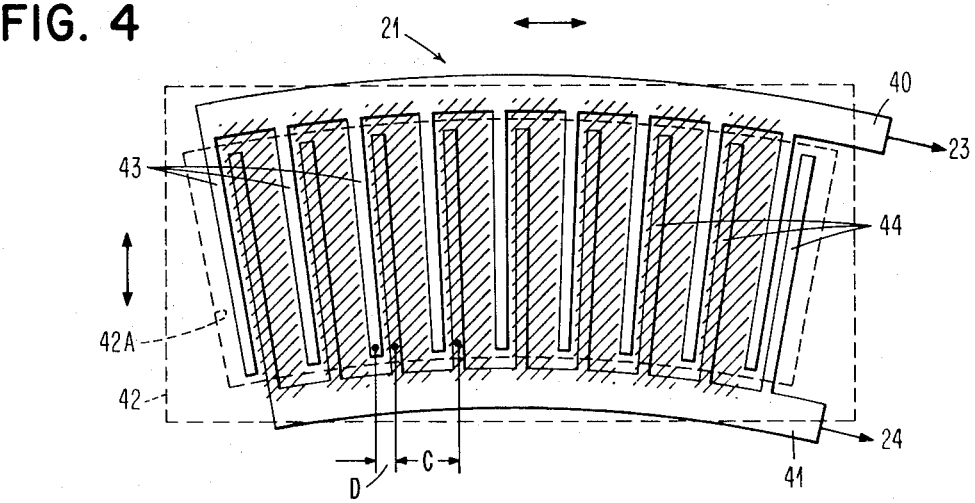
FIG. 4 is a greatly enlarged diagrammatic showing of a two-phase sensing element constructed in accordance with the teachings of the present invention.

The sensing element 21 of FIG. 1 is shown in enlarged detail in FIG. 4. An integrated circuit chip, shown in FIG. 6, has a plurality of inter-digitated sensing elements for the respective phases. In FIG. 4, signal 23 is taken from land or conductive area 40; while signal 24 is taken from conductive area 41. Sensing elements 43 extend downwardly from land area 40 to lie within mask 42 aperture 42A. The mask may be deposited on the sensing element. These sensing elements 43 lie closely to upwardly extending sensing elements 44 connected to land area 41. The center distances between adjacent ones of sensing elements 43 and adjacent ones of sensing elements 44 are respectively equal to the pitch of the tachometer disk with which the sensing element is to be used. The hatched areas represent the dark areas of a tachometer disk within mask aperture 42A. By interdigitating the sensing elements (as shown, to have the sensing elements subtend the same arc) to provide a 90° phase shift by placing elements 41 intermediate adjacent elements 43 at one-fourth the distance therebetween, phase shift is minimized. Actual phase shift is given by equation (2) below:

$$D/C \times 360° \qquad (2)$$

The numerals C and D correspond to the distances demarked in FIG. 4. As it turns out, that is a constant; hence, there is no phase shift caused by adjustment of the sensing element with respect to the mask or tachometer disk. The interleaving or interdigitating of the sensing elements across the same subtended angle thereby reduces the distance between the signal 23 sensing elements and the signal 24 sensing elements to zero. That is, such sensing elements subtend the same arc on the tachometer disk and therefore are insensitive to minor positional variations, i.e., do not introduce undesired phase perturbations.

In comparative tests conducted using about a two-inch diameter tachometer disk between the FIG. 1 illustrated embodiment and the FIG. 2 illustrated embodiment, a change in position of the sensing element with respect to the mask, i.e., axially moving away from the mask (into the paper of FIG. 2), caused a 90° phase shift (from 90° phase difference to either 0° or 180° phase difference) for 0.005 inch distance change. In conducting the same test with the FIG. 1 illustrated embodiment, there was no noticeable phaseshift change.

In a second comparative test between the prior art and the tachometer of the present invention, the sensing elements were moved radially to the disk circumference, for example, upwardly or downwardly as shown in FIG. 2. With the FIG. 2 arrangement for a 10 mil travel, radial to the direction of rotation of the tachometer disk, a 90° phase change was noticed in the FIG. 3 waveforms. That is, signal 24 will now be 180° from signal 23 rather than the desired 90°. In conducting the same test on an apparatus using the invention, a radial movement of 0.050 of an inch was performed with no measurable phase perturbations between signals 23 and 24. Accordingly, the preciseness of mounting and adjusting tachometers using the FIG. 4 illustrated sensing element in the FIG. 1 illustrated arrangement is greatly facilitated, as well as increasing the reliability of tachometer systems.

Figure 5:
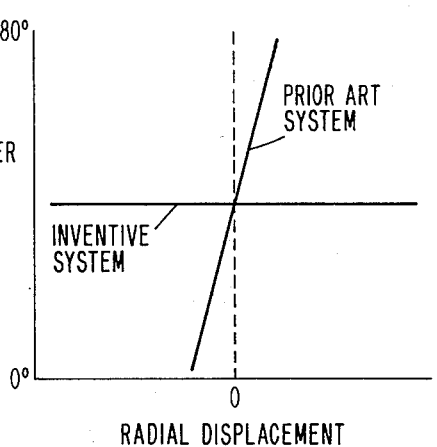
FIG. 5 is a graphical presentation of phase shift and displacement relationships of prior-art systems and the inventive system.

In the radial test, moving the sensing element with respect to the tachometer disk misaligned the sensing elements with respect ot the light/dark areas on the tachometer disk. This misalignment, of course, reduces signal amplitude; but also in the case of the FIG. 2 illustration, introduces phase shift as shown in FIG. 5. The nominal position is at zero with radial adjustment as positive and negative phase shift from the 90° displacement as shown in FIG. 3. In the inventive system, such radial displacement did not cause phase perturbations between signals 23 and 24. Further tests showed that combined movements of varying amounts—tangential, axial, and radial—produced similar results; phase changes in the prior art system and no phase changes using the present invention.

Figure 6:
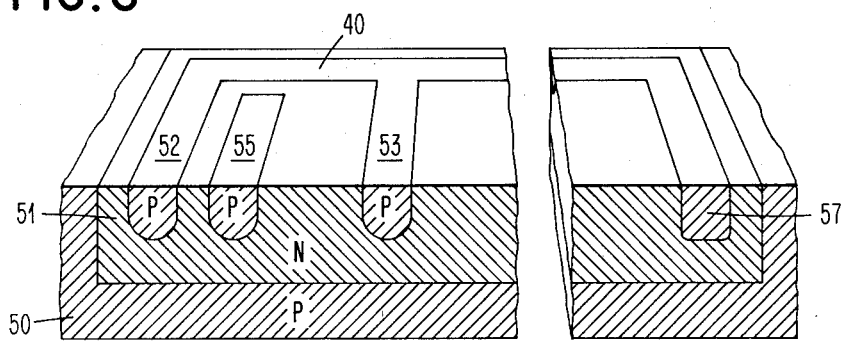
FIG. 6 is a greatly enlarged and simplified partial diagrammatic showing of an integrated circuit embodiment of the FIG. 4 illustrated sensing element.

Referring next to FIG. 6, a typical construction of an integrated circuit sensor in accordance with the present invention is shown. The circuit chip has isolation region 50 with a diffused region 51 forming a ground or electrical reference connection for the photosensors. To produce signal 23, a first set of photosensors 52 and 53 are diffused into region 51 as shown and attached to land area or conductive portion 40. An intermediate sensor for signal 24 is diffused at 55 and extends (not shown in FIG. 6) to conductive area 41. The junctions between regions 52, 53, 55, and base region 51 provide the photoelectric responsiveness of the element as is well known. Electrical connections are made to the conductive areas in the usual manner.

Also included in the scope of the present invention is the inclusion of signal amplifier means 57 in the FIG. 6 illustrated chip. Amplifier means 57 is shown as a region, it being understood that in a constructed embodiment known integration techniques result in semiconductive arrangements within the chip having complex geometrics. Such techniques and semiconductive structures are so well known as not to warrant further comment.

Figure 7:
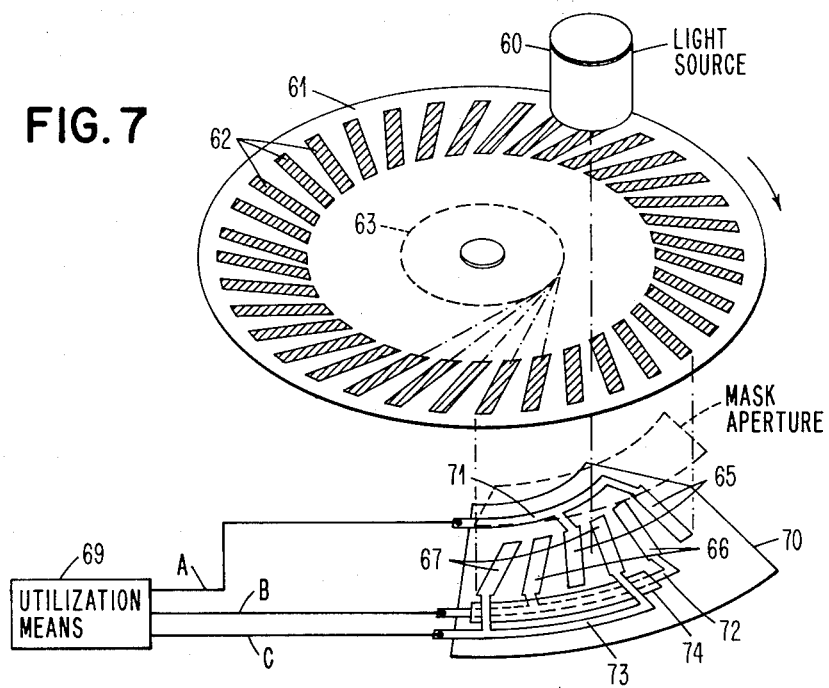
FIG. 7 is a diagrammatic showing of a three-phase system using truncated tangential sensing elements.

Referring next to FIG. 7, a three-phase tachometer system constructed in accordance with the teachings of the present invention is shown in diagrammatic form. Light source 60 emits light through see-through tachometer disk 61. Disk 61 has a plurality of circumferentially disposed, tangentially oriented, light-transmitting segments 62. Elements 62 have one line portion extending tangential to inner circle 63. Light transmitted through disk segments 62 is intercepted by the three-phase sensing elements 65, 66, and 67 respectively generating 0A, 0B, and 0C signals for utilization means 69. Each of the elements 65, 66, and 67 include a pair of semiconductive light responsive areas within circuit chip 70. Elements 65 are electrically joined together at the radial inward portion as at conductive area 71; elements 66 are joined together in the semiconductor chip in the radial outward portion at conductive area 72; while elements 67 are joined together in the radial outward portion above area 72 at conductive area 73. Electrical insulating layer 74 is interposed between the conductive areas 72 and 73.

From inspection of FIG. 7, it is seen that as disk 61 is rotated past the sensing areas, elements 65 will respond first to the light areas passed by segments 62, then elements 66, and finally elements 67 generating three successive phases indicative of direction and magnitude of rotation. Reverse rotation will cause the phases to appear in the reverse order.

From examination of the figures and the description, it can be seen that 2, 3, 4, or more phase tachometer systems can be constructed in accordance with the invention. As seen in FIGS. 1, 4, and 7, the interdigitation of the sensing elements causes the total of the elements to subtend the same arc or sensing area in the tachometer system. Accordingly, the sensitivity to positional variations between the sensing elements and the tachometer disk will affect all of the sensing elements substantially the same thereby eliminating phase shift.

The teachings of the present invention are also applicable to linear systems as well as rotational systems. It is to be understood that the segments of the sensing elements and the tachometer disk may take on any geometric configuration so long as the respective configurations of the segments in the disk and in the sensing elements are similar and have the same general geometric relationships.

While the invention has been particularly shown and described with reference to preferred embodiments thereof, it will be understood by those skilled in the art that various changes in form and details may be made therein without departing from the spirit and scope of the invention.

What is claimed is:

1. A plural phase tachometer, including in combination:

a light source, sensing means, a single light path extending between said source and sensing means;

a circular tachometer element rotatable about a given axis having light path breaking and making portions of given shape and circumferential pitch, said portions being circumferentially equally spaced apart coaxial to said given axis and interposed between said source and sensing means to alternately interrupt and complete said single light path as said element rotates about said given axis; and said sensing means including mask means limiting light to a given area on said sensing means, a first light-responsive finger having a shape like said portions and extending along said area substantially parallel to and axially spaced from said portions, and a second light-responsive finger extending along said area and having a shape like said portions and spaced from said first light-responsive finger in a circumferential direction a given proportion of said pitch less than unity and being radially coextensive with said first light-responsive finger such that both said light-responsive fingers substantially subtend the same area of said tachometer element.

2. The apparatus set forth in claim 1, the improvement further including:

said mask means extending circumferentially a given length approximately equal to an integral number of said pitches;

a given number of said first light-responsive fingers and a given number of said second light-responsive fingers disposed in said given area; and all of said first light-responsive fingers and said second light-responsive fingers being connected together, respectively.

3. The subject matter set forth in claim 2 wherein said first light-responsive fingers extend radially inwardly with respect to said element and said second light-responsive fingers extend radially outward thereof; and conductive means connected respectively to said first and second light-responsive fingers respectively on the radial outward and radial inward portion of said sensing element means such that said elements are interdigitated.

4. The subject matter set forth in claim 3 further including a semiconductive chip, said chip including said first and second light-responsive fingers and said conductive means; and wherein said given proportion is one-fourth to yield a 90° phase difference between signals induced in said first and second light-responsive fingers.

5. The subject matter set forth in claim 3 wherein said circumferential extent of said first and second light-responsive fingers is shorter than said pitch and the light path making portions being shorter than said pitch such that the total light area impinging upon a given light-responsive finger is smaller than dark areas.

6. The plural phase tachometer set forth in claim 1 further including a third light-responsive finger extending along said area radially coextensive with said first and second light-responsive fingers and having a shape like said portions and disposed parallel to said first and second light-responsive fingers;

all said light-responsive fingers circumferentially lying within a distance equal to said pitch; and means connected to each said light-responsive fingers for receiving electrical signals from each said light-responsive fingers for generating three-phase output tachometer signals.

7. The plural phase tachometer set forth in claim 1 wherein each said light-responsive fingers and said portions being tangentially oriented about a circle coaxial with an axis of rotation of said tachometer element.

8. A tachometer signal generator adapted to operate with a tachometer element having alternating light and dark means of given geometric configuration extending in given direction and having a given pitch transverse to said given direction, including in combination:
a support;
first sensing means on said support of approximately said given geometric configuration and extending along said given direction;
second sensing means on said support of approximately said given geometric configuration and coextensive with said first sensing means along said given direction and disposed parallel to said first sensing means and spaced therefrom a given proportion of said pitch less than unity along said transverse direction; and
output means on said support connected to said means for supplying output tachometer signals.

9. The signal generator set forth in claim 8, a mask area on said generator, said output means includes a pair of conductive means extending on opposite extremities of said sensing means in said given direction and said conductive means being outside said mask area;
a plurality of said first sensing means extending along said first direction from a first of said conductive means toward a second of said conductive means and being separated precisely in accordance with said given pitch; and
a like plurality of said second sensing means extending toward said one conductive means from said other conductive means and separated from each other precisely by said given pitch, and all of said second sensing means having said proportional relationship to said first sensing means along said transverse direction for yielding a predetermined phase difference between signals supplied through said one and other conductive means and the arrangement being such that said sensing means is interdigitated and establishes said given proportion through said interdigitation for subtending the same light-impinging area for limiting phase shift between said sensing means generated signals.

10. The generator set forth in claim 9, a common axis, said sensing means extending along various radii of said common axis, and all of said sensing means having approximately the same cross-sectional light-responsive areas smaller than the areas within said mask limiting light area which include nonresponsive light portions.

11. The generator set forth in claim 9, a common axis, said sensing means being circumferentially spaced apart about said common axis and being radially coextensive and all said sensing means being coaxial to said axis.

* * * * *